(12) United States Patent
Saward

(10) Patent No.: US 6,997,657 B1
(45) Date of Patent: Feb. 14, 2006

(54) STANCHION AND CROSS RAIL ASSEMBLY

(75) Inventor: Ronald G. Saward, Shelby Township, MI (US)

(73) Assignee: SportRack LLC, Sterling Heights, MI (US)

( * ) Notice: Subject to any disclaimer, the term of this patent is extended or adjusted under 35 U.S.C. 154(b) by 0 days.

(21) Appl. No.: 11/101,862

(22) Filed: Apr. 8, 2005

(51) Int. Cl.
*B60P 7/08* (2006.01)

(52) U.S. Cl. ............... 410/106; 410/104; 410/150; 224/315; 224/321

(58) Field of Classification Search ............... 410/101, 410/104, 106, 110, 150; 224/315, 321, 322, 224/325, 326, 329, 331; 248/228.2, 231.31, 248/351
See application file for complete search history.

(56) References Cited

U.S. PATENT DOCUMENTS

| 4,500,020 | A | * | 2/1985 | Rasor | |
|---|---|---|---|---|---|
| 4,911,348 | A | * | 3/1990 | Rasor et al. | |
| 5,997,227 | A | * | 12/1999 | Bundy | 410/106 |
| 6,247,881 | B1 | * | 6/2001 | Shuen | 410/106 |
| 6,884,011 | B1 | * | 4/2005 | Saward | 410/106 |

* cited by examiner

*Primary Examiner*—Stephen Gordon
(74) *Attorney, Agent, or Firm*—Rader, Fishman & Grauer PLLC

(57) ABSTRACT

A stanchion for an article carrier system comprises a main body member having a cavity extending inwardly of the main body member from a plate. A floor of said cavity includes a first plurality of circumferentially spaced ramps. The stanchion further includes an arm having an end sized to rotate within the cavity. The cavity includes a bottom edge that includes a second plurality of circumferentially spaced ramps. A post is also included in the stanchion and has a first end positioned within the cavity and secured to the arm. The post also has a second end that includes a cleat. The first plurality of ramps and the second plurality of ramps are configured to cooperate to raise and lower the cleat in relation to the main body member when the arm is rotated about the main body member.

20 Claims, 8 Drawing Sheets

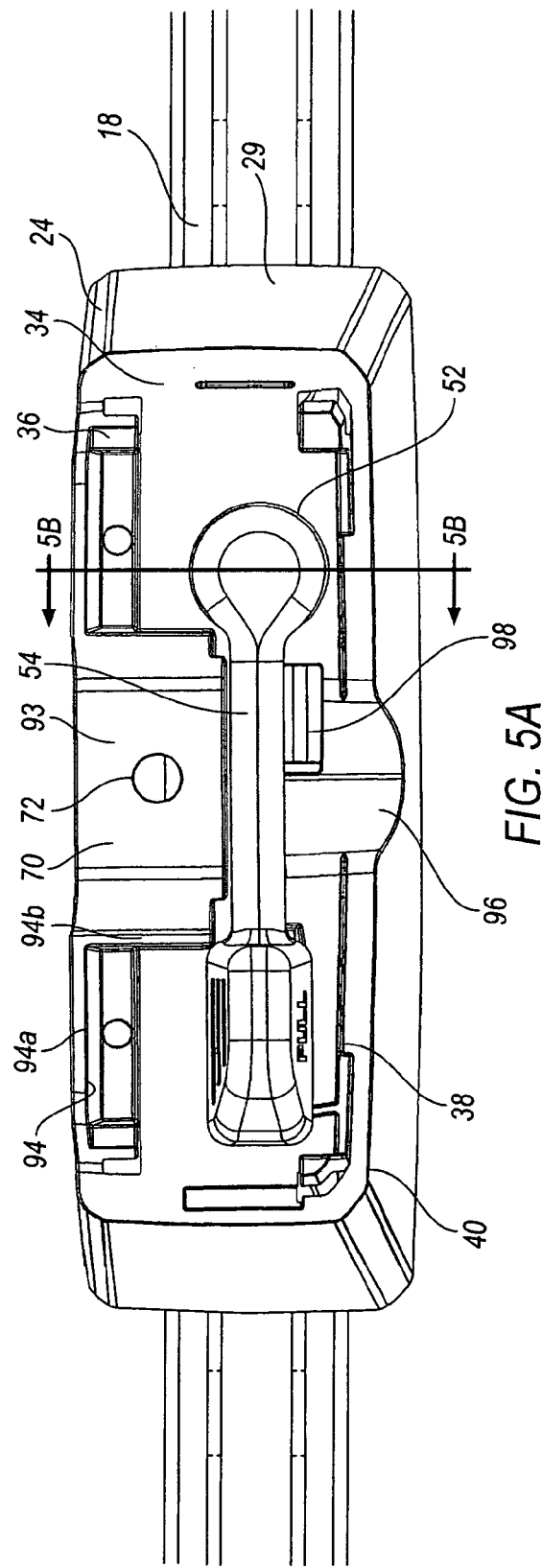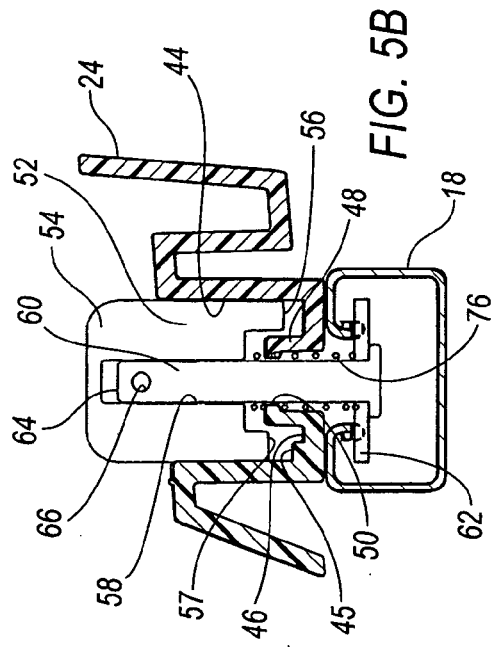

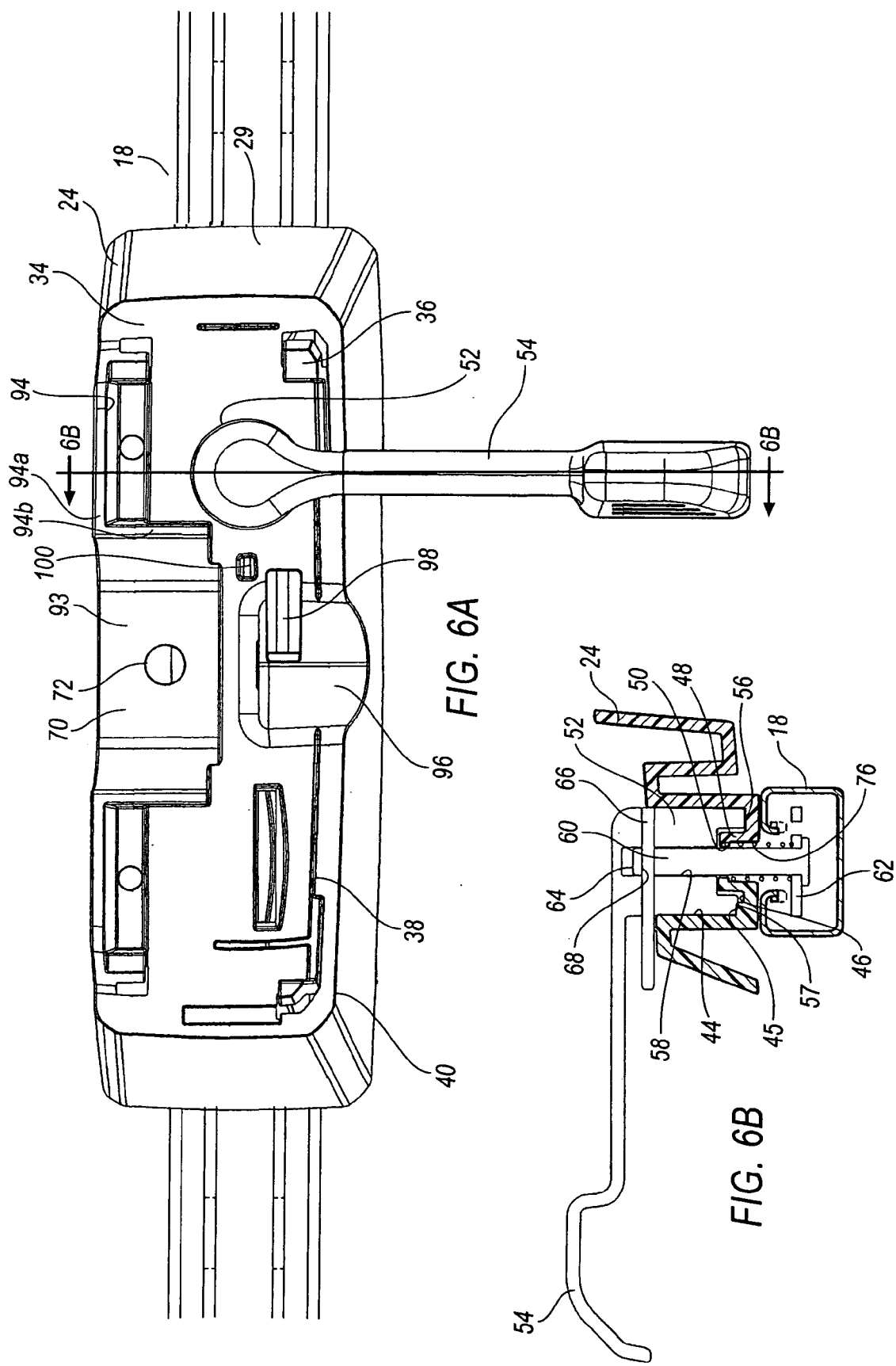

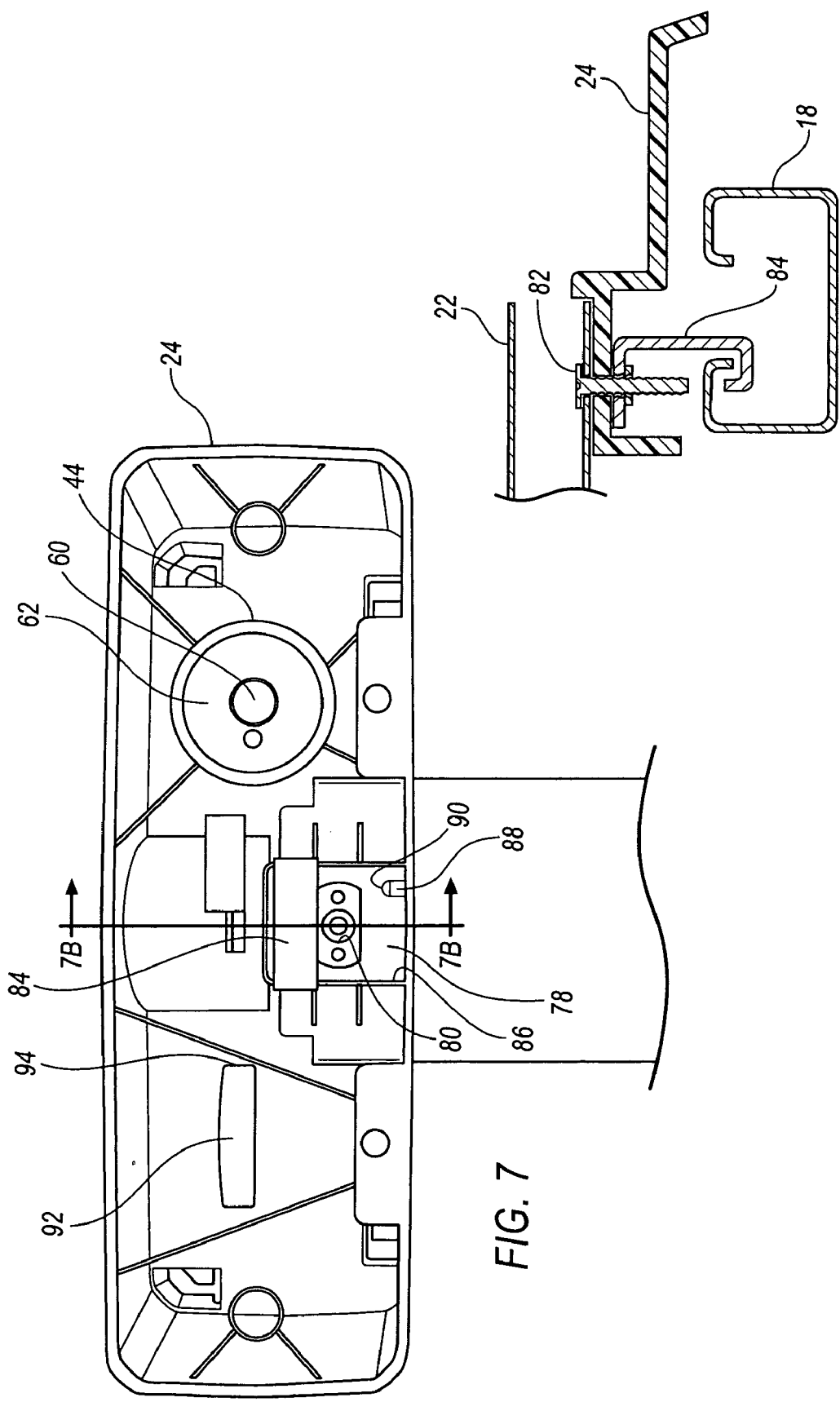

STANCHION AND CROSS RAIL ASSEMBLY

FIELD OF THE INVENTION

The present invention relates generally to article carrier systems for motor vehicles and, more particularly, to a stanchion for positioning and securing cross rails in various locations in the article carrier system.

BACKGROUND OF THE INVENTION

Article carrier systems are well known throughout the automotive industry for use in storing or retaining luggage, bicycles, small boats, or the like on the exterior of a motor vehicle even while in motion. Typically, article carrier systems include a number of individual components such as supports, side rails, stanchions, cross rails, and the like. Generally, in a roof mounted carrier system, a support is secured to each of the four corners of a vehicle roof. A side rail is positioned in between and secured to two of the four supports in a manner such that two side rails are essentially parallel to one another and extend between the front and the rear of the vehicle. Stanchions may then be attached to the side rails to provide for placement of cross rails at the stanchions, which are disposed between and extend generally perpendicularly to the side rails. The complete assembly forms the article carrier system. Similar systems can be configured for the trunk lid, pickup bed, window, or any exterior surface of a vehicle.

In one type of article carrier system, stanchions are permanently secured to the side rails in a manner that prevents the repositioning of the stanchions and cross rails in the article carrier system. This assembly may limit the size and shape of articles or loads carried by the vehicle because the cross rails cannot be properly spaced to accommodate certain articles or loads. Having a stanchion and cross rail assembly that is moveable and positionable is advantageous because articles requiring securement and transport on the roof of a vehicle come in a variety of sizes. Moveable stanchions and cross rails allow the operator to position the cross rail in the optimal location to properly and safely secure the article to and transport the article on the article carrier system and the roof of a motor vehicle.

While having a moveable and positionable stanchion and cross rail is advantageous for properly and safely positioning articles and loads on the vehicle, they do, however, pose an easy target for thieves. Thieves can easily loosen the stanchions from the side rails, usually by loosening a fastener such as a thumb wheel/bolt combination or depressing a spring loaded clip, sliding the stanchions out of the side rails, and removing the cross rails, often with the articles still secured to the cross rails.

Designers of theses article carrier systems have developed supports for the side rails that act as end caps and secure the stanchions in the side rails while still allowing the stanchions and cross rails to be moved and positioned. This arrangement presents a theft deterrent to would-be thieves by requiring the disassembly of the supports from the roof prior to the removal of the stanchions and cross rails from the side rails. While the "sealed" ends of the supports deter thieves from stealing the stanchions and cross rails, they may be inconvenient to the actual owners who may want to remove the stanchions and cross rails when not in use, or the actual design of the article carrier device may not lend itself to having an end of the side rail sealed by a support.

Another issue presented by the present article carrier systems and the moveable and positionable stanchions and cross rails is that an operator cannot ensure that the stanchions are properly positioned and secured to the side rails. If the stanchions are not properly seated and secured to the side rails, the articles or loads may move and shift during transit causing the securement mechanisms used, such as rope or elastic cords, to loosen, thereby presenting the possibility that the load or article may be lost on the highway or road, thus leading to a loss of property as well as safety concerns. With the thumb-wheel type fasteners, operators must physically check to ensure that each stanchion is properly secured to the side rail. A visual check cannot be made. There is no way to ensure that the stanchions are properly seated without a physical check. The same holds for the spring loaded detent type fasteners, which must be physically checked to ensure that they are properly seated and secured to the side rail.

Therefore, a need exists for a stanchion and cross rail assembly that can be easily secured to and removed from an article device without having to disassemble the supports from the roof of the vehicle. A need also exist for a stanchion and cross rail assembly that presents a deterrent to would-be thieves and also allows the operator to visually inspect the stanchions to ensure that they are properly secured to the side rails.

SUMMARY OF THE INVENTION

A stanchion for an article carrier system is provided that comprises a main body member having cavity extending inwardly into the main body member from a plate. A floor of said cavity includes a first plurality of circumferentially spaced ramps adjacent to the floor. The stanchion further includes an arm having an end sized to rotate within the cavity. A second plurality of circumferentially spaced ramps is positioned adjacent to a bottom edge of the end. The cavity includes a bottom edge that includes a second plurality of circumferentially spaced ramps. A post is also included in the stanchion and has a first end positioned within the cavity and secured to the arm. The post also has a second end. A cleat is located adjacent to the second end. The first plurality of ramps and the second plurality of ramps are configured to raise and lower the cleat in relation to the main body member when the arm is rotated about the main body member.

BRIEF DESCRIPTION OF THE DRAWINGS

The features and inventive aspects of the present invention will become more apparent from the following detailed description, claims, and drawings, of which the following is a brief description:

FIG. 5A is a plan view of the stanchion of FIG. 1 shown with the arm positioned in the locked position;

FIG. 5B is a cross-sectional view of the stanchion of FIG. 5A with a cleat shown in the locked position;

FIG. 6A is a plan view of the stanchion of FIG. 1 shown with the arm positioned in the unlocked position;

FIG. 6B is a cross-sectional view of the stanchion of FIG. 6A with the cleat shown in the unlocked position; and FIG. 7 is a bottom view of the stanchion of FIG. 1.

FIG. 7B is a cross-sectional view taken along line 7B—7B in FIG. 7A.

DETAILED DESCRIPTION

Figure 1:
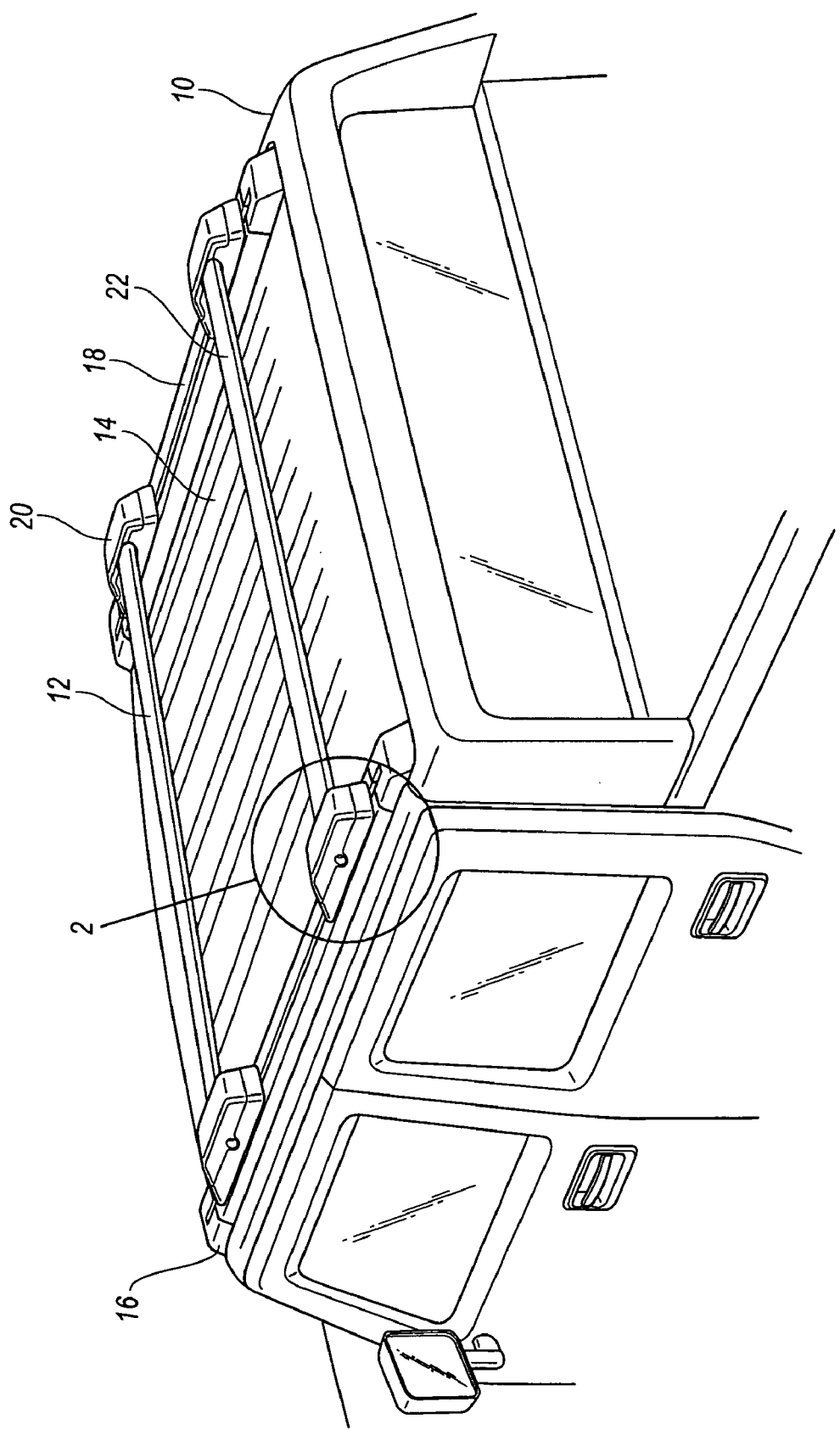
FIG. 1 is a perspective view of an article carrier system mounted to a motor vehicle having a stanchion and cross rail assembly according to an embodiment of the present invention.

Referring now to the drawings, a preferred illustrative embodiment of the present invention is shown in detail. Although the drawings represent an embodiment of the present invention, the drawings are not necessarily to scale and certain features may be exaggerated to better illustrate and explain the present invention. Further, the embodiment set forth herein is not intended to be exhaustive or otherwise to limit or restrict the invention to the precise forms and configurations shown in the drawings and disclosed in the following detailed description.

A motor vehicle 10 is illustrated in FIG. 1 having an article carrier system 12 secured to a roof 14 of vehicle 10. Article carrier system 12 comprises four supports 16, secured respectively adjacent to each of four corners of roof 14. A pair of side rails 18 extend generally from the front to the rear of vehicle 10, each side rail being disposed between two supports 16. Article carrier system 12 further includes stanchions 20, each constructed according to an embodiment of the present invention. Four of the stanchions 20 are positioned on side rails 18 (two stanchions 20 are illustrated positioned on each of side rails 18). Cross rails 22 are secured to stanchions 20 (a single cross rail 22 is secured between two stanchions 20) and generally span side rails 18 perpendicularly. Stanchions 20 are employed to position and secure cross rails 22 in relation to side rails 18 so that an article may be properly secured to article carrier system 12. The following describes the article carrier system as it is located and secured to the roof of a vehicle, however, it must be noted that the article carrier system may be located and secured to any relatively flat surface of a vehicle, such as the bed of a pickup truck or a deck lid of a trunk.

Figure 2:
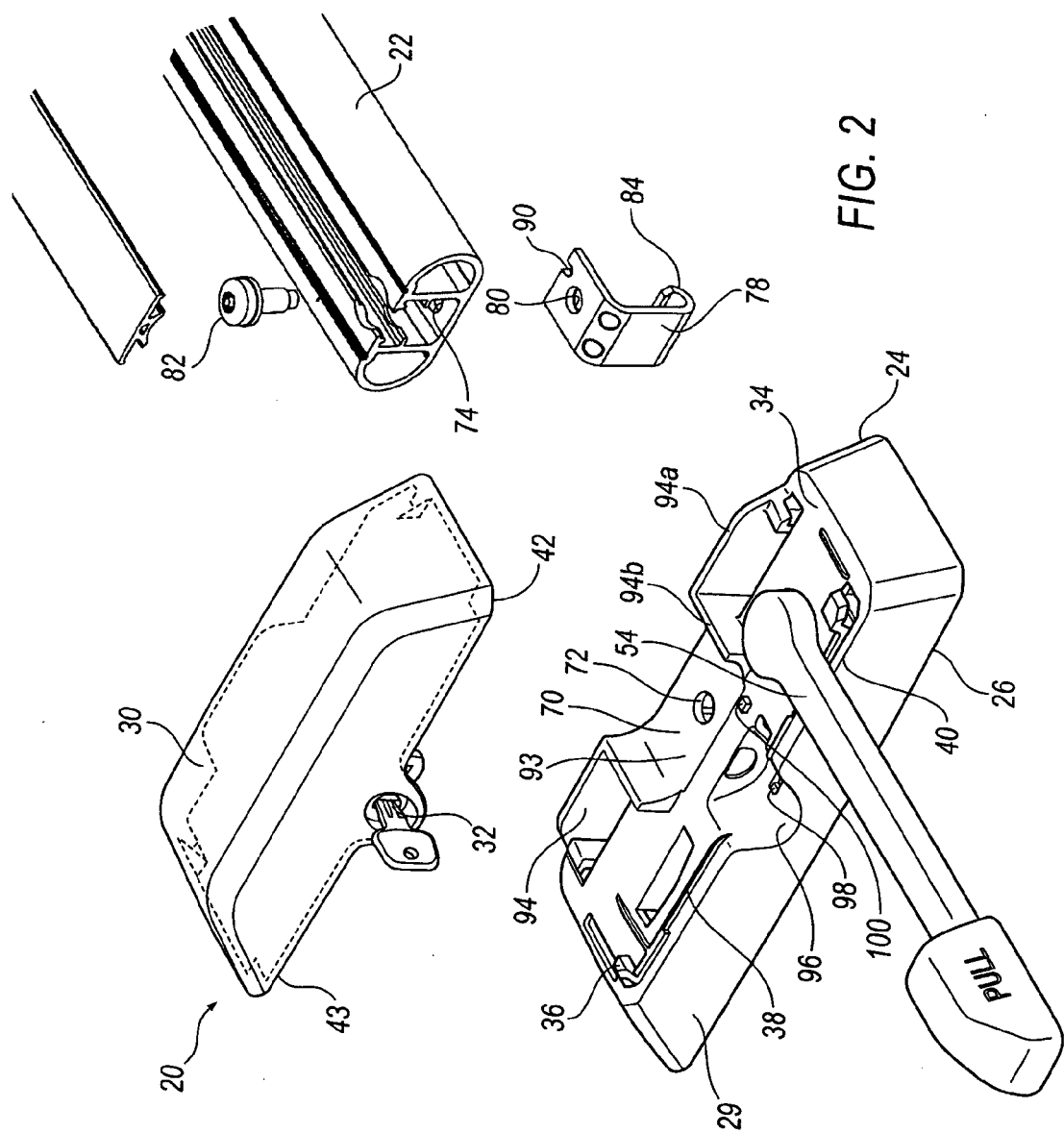
FIG. 2 is an enlarged perspective view of the stanchion of FIG. 1 shown with a cover removed to expose the interior components of the stanchion as well as a cross rail disassembled from the stanchion.
Figure 3:
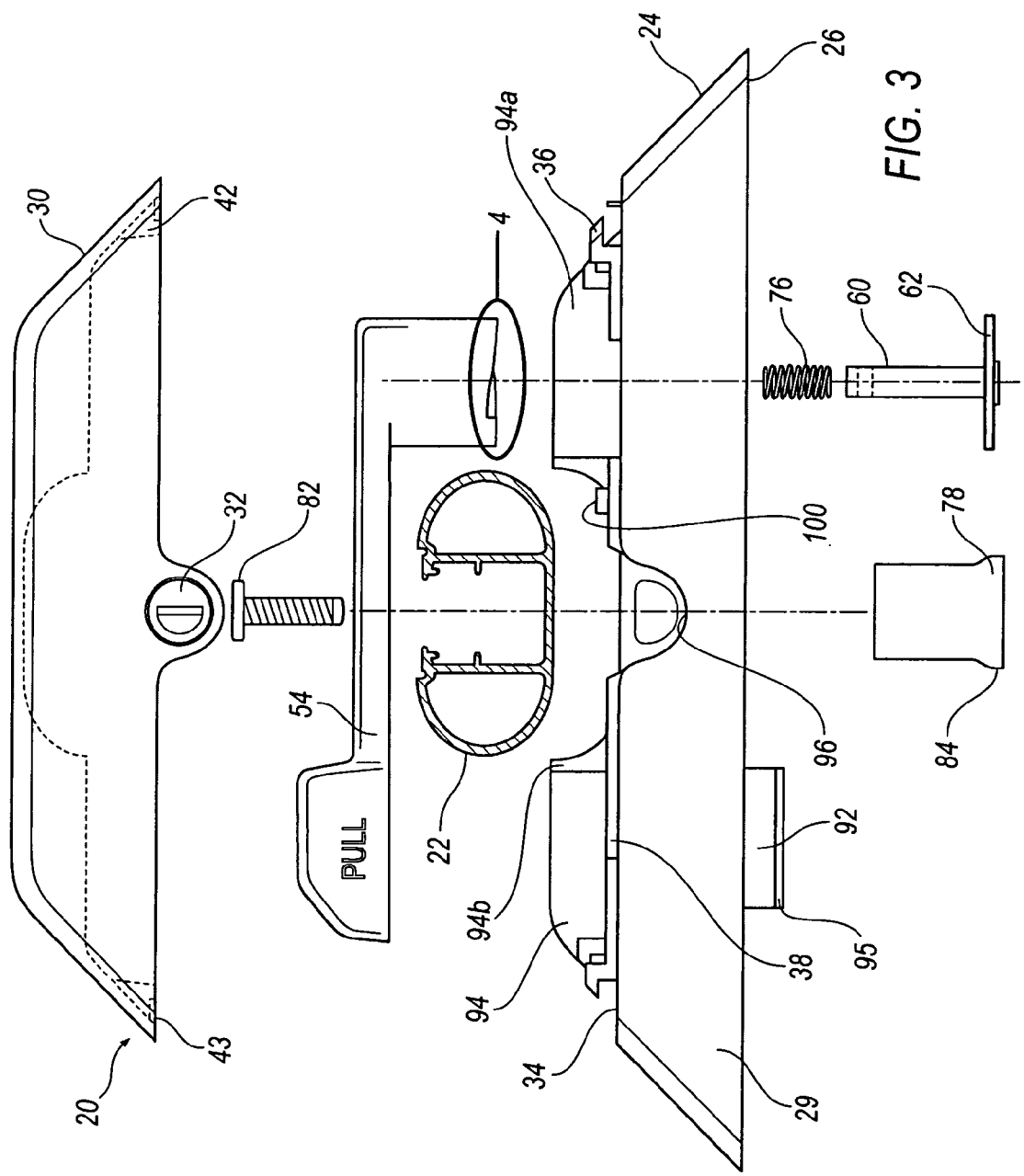
FIG. 3 is an exploded view of the stanchion and cross rail of FIG. 1.

As illustrated in FIGS. 2 and 3, stanchion 20 includes a main body member 24 having a bottom edge 26 that supports the body member. A portion of bottom edge 26 is configured to slide along a top surface of side rail 18 when the operator is positioning stanchion 20 on and along side rail 18. A wall 29 extends upwardly from bottom edge 26 to a plate 34 of main body member 24. In this particular embodiment, three sides of wall 29 are angled inwardly from bottom edge 26 to plate 34. A fourth side of wall 29 is angled outwardly from the bottom edge to the plate. The angling of the sides of wall 29 may be done for aesthetic purposes and may be done independently of the structure of main body member 24.

Stanchion 20 further includes a cover 30 having a locking mechanism 32 configured to securely lock cover 30 to body member 24. Included on a top surface of plate 34 are protrusions 36 positioned respectively adjacent to each of the four corners of plate 34 as well as a lip 38 that is positioned near a front edge 40 of plate 34. Cover 30 includes tabs 42 positioned respectively adjacent each of four corners of cover 30 near a bottom edge 43. Main body member 24 further includes a depression 96 that extends downwardly from plate 34 to define a location for receiving locking mechanism 32 of cover 30. Depression 96 includes a slot 98 to accept a blade (not shown) of locking mechanism 32 when cover 30 is locked to main body member 24. Locking mechanism 32, cooperatively with tabs 42, protrusions 36, and lip 38, aid in positioning and securing cover 30 to main body member 24.

Figure 4:
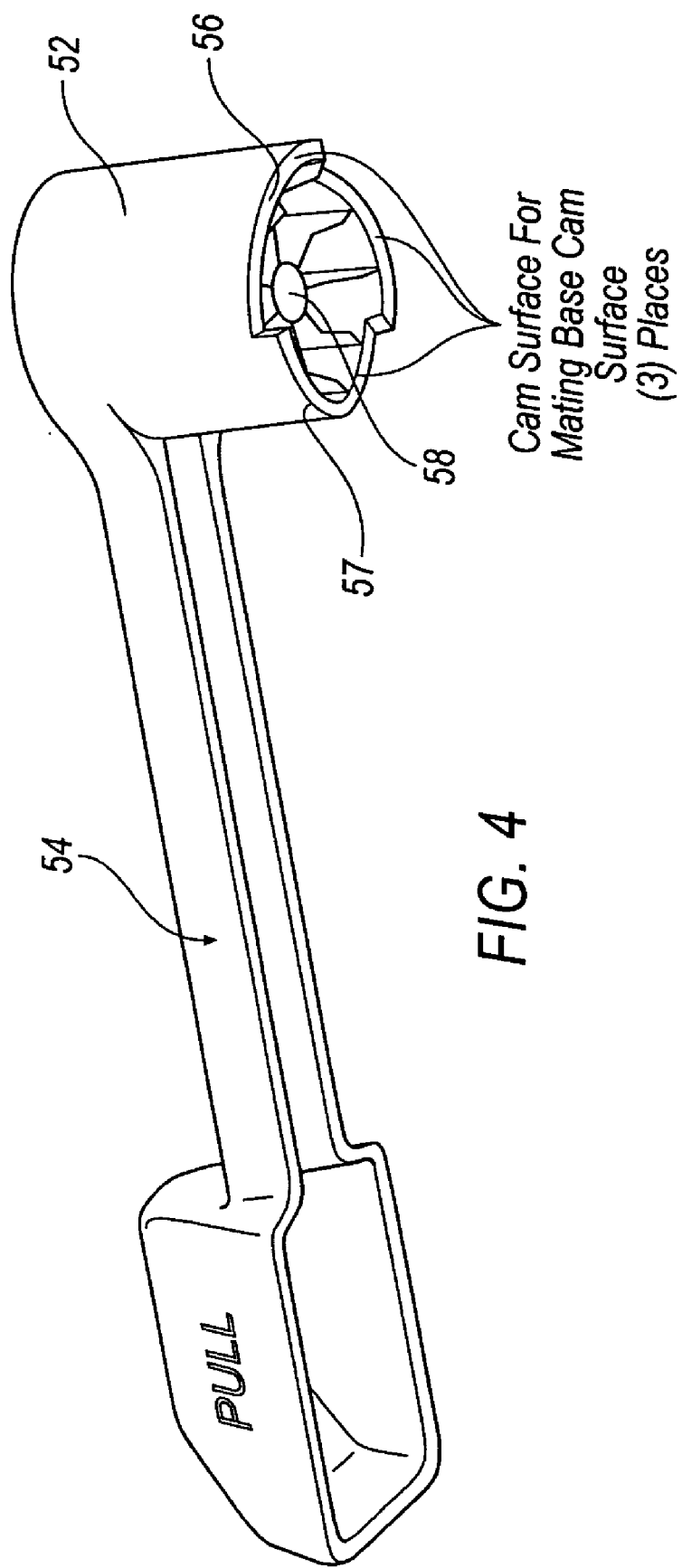
FIG. 4 is a perspective view of an arm of FIG. 3 showing cam surfaces.
Figure 5C:
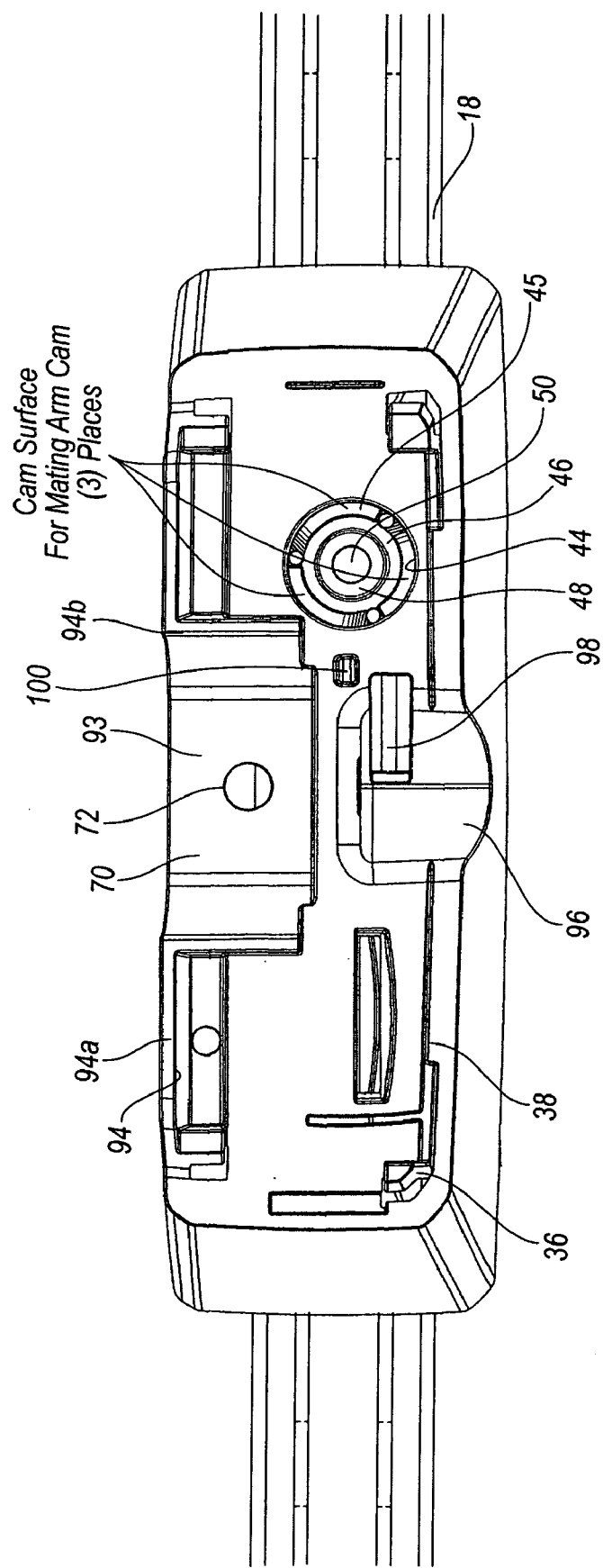
FIG. 5C is a plan view of the stanchion of FIG. 5A shown with the arm removed to reveal cam surfaces in a cavity of the stanchion.

Now referring to FIGS. 5A–6B, main body member 24 also includes a cylindrically shaped cavity 44 extending inwardly from plate 34 to a floor 46. An exterior surface of floor 46 is configured to interface with and slide about a top surface of side rail 18 when the operator positions stanchion 20 on side rail 18 (see FIGS. 5B and 6B). An interior surface of floor 46 includes a plurality of circumferentially spaced ramps 45 positioned around a perimeter of cavity 44. Also included within cavity 44 is a tower 48 having an aperture 50, which is generally centered in and extends upwardly from floor 46. Referring now also to FIG. 4, cavity 44 is sized to accept a cylinder portion 52 of an arm 54. Cylinder portion 52 also includes a plurality of circumferentially spaced ramps 56 located adjacent to its bottom edge 57. In the illustrated embodiment, the ramps 56 are actually on its bottom edge. Ramps 56 are configured to interface with ramps 45 of cavity 44 as arm 52 is rotated about main body member 24. Cylinder portion 52 further includes a cylindrical shaft 58 that extends the length of cylinder portion 52 and is sized and configured to interface with aperture 50 of tower 48.

Referring now also to FIG. 3, stanchion 20 further includes a post 60 provided with a cleat 62. Much of post 60 is sized and configured to be pass through aperture 50 of tower 48 and cylindrical shaft 58 in arm 54. An end 64 of post 60, which is opposite cleat 62 in the illustrated embodiment, may be positioned near the top of cylindrical shaft 58 opposite tower 48. However, cleats 62 can also be positioned adjacent end 64. Post 60 further includes a hole 66 that is configured to interface with a hole 68 on arm 54 so that a fastener, such as a cotter pin, may be introduced through holes 66 and 68 to secure post 60 to arm 54. Cleat 62 is sized so that it is larger than aperture 50 and will prevent post 60 from being removed through aperture 50 once post 60 is secured to arm 54, thereby securing post 60 and arm 54 to main body member 24. In this particular embodiment, cleat 62 is a round disk having a diameter slightly less than that of cavity 44 and may be manufactured from a metallic material such as steel. Cleat 62 may also be designed in any number of shapes, such as square or rectangular, and is not limited to a round disk configuration.

A biasing member 76, such as a spring, is further included between the top surface of cleat 62 and the bottom surface of tower 48. Biasing member 76 exerts a downward force on cleat 62 to ensure that cleat 62 remains in a downward position so as not to interfere with the travel of main body member 24 through side rails 18 when stanchion 20 is not secured to side rails 18.

Arm 54 generally extends much of the length of stanchion 20 when arm 54 is in the locked position. Arm 54 is configured to be rotated about tower 48 to raise and lower cleat 62 to lock and unlock stanchion 20 to and from side rail 18. Also included on the top surface of plate 34 is a tab 100 (shown in FIG. 3) that aids in positioning arm 54 when the arm is in the locked position. Tab 100 helps to ensure that arm 54 remains in the locked position by requiring some force to overcome the tab as arm 54 is rotated to the unlock position.

Referring now to FIGS. 2, 3, 5A, 5C, and 6A, main body member 24 further includes walls 94 extending generally upwardly from the top surface of plate 34 to create a cradle 70 sized to accept a portion of cross rail 22. Walls 94 have a first component 94a that is generally perpendicular to cross rail 22 when secured to stanchion 20 and a second component 94b that is generally parallel to cross rail 22 when secured to stanchion 20. The two second wall components 94b have curved inward portions to match the contour of cross rail 22 and cooperatively with a slight depression 93 in plate 34 form cradle 70 so that cross rail 22 may be properly positioned and secured to stanchion 20. Walls 94 are fashioned in this manner, with perpendicular and parallel components, to provide added strength and load distribution for cross rails 22 while operating the vehicle during transients, which may cause the load on the article carrier system to shift its weight.

Included in plate 34 at cradle 70 is an aperture 72 that is sized and configured to mate with a hole 74 in cross rail 22 so that a fastener 82 may be inserted into hole 74 and aperture 72 to mate with a threaded aperture 80 of a grip 78 to positively secure cross rail 22 to stanchion 20. In another embodiment, a threaded fastener, such as a nut, could be used to replace threaded aperture 80 if, for instance, grip 78 was to be manufactured of a different material from the fasteners.

Referring now also to FIGS. 7A and 7B, grip 78 is sized to be seated on the bottom side of body member 24 in a walled cavity 86. Walled cavity 86 includes a positioning member 88 that is sized to cooperate with a slot 90 on grip 78 to ensure grip 78 is positioned on stanchion 20 to interface properly with the slot of side rail 18. Grip 78 further includes a hook portion 84 sized to fit within the slot of the side rail 18 to guide stanchion 20 in side rails 18 and to ensure that stanchion 20 is seated properly in detents include in the slots of side rails 18. Grip 78 may be manufactured from any metallic material, such as steel, or polymeric material, such as plastic, to ensure that cross rail 22 is safely and properly secured to stanchion 20.

Grip 78 is configured so that if it is not seated properly in the detent of side rail 18, stanchion 20 cannot be locked to side rail 18. As arm 54 is rotated to lock stanchion 20 to side rail 18, cleat 62 will compress the side rail material against the exterior surface of floor 46 prior to arm 54 being fully rotated into a generally parallel, locked position in relation to side rail 18. The operator will be alerted to this inability to fully lock the stanchion to the side rail and correct the problem by repositioning stanchion 20 on side rail 18. As an added safeguard, cover 30 cannot be locked to main body member 24 until arm 54 is properly seated on main body member (seated so that arm 54 is generally parallel side rail 18).

Extending generally vertically and downwardly from plate 34 is a guide 92. Guide 92 includes a lip 95 for interacting with the slots of side rails 18. Guide 92 is used in positioning stanchion 20 in slots of side rails 18 as stanchion is moved along side rails 18. The bottom side of main body member 24 further includes a number of ribs that extend from the bottom surface of plate 34 generally vertically downwardly to add strength between the components, such as walls 29, cylinder 52, and cavity 86.

Main body member 24, cover 30 and arm 54 may be manufactured from any metallic material such as steel or aluminum or any polymeric material such as plastic or nylon. In this particular embodiment, each of the three components is manufactured from a polymeric material that provides adequate strength and durability at lesser costs than other materials. Metallic materials may be suitable for all or some of the components if added strength and durability are required.

Stanchion 20 is operated in the following manner. With cover 30 unlocked and removed from main body member 24 and main body member 24 positioned on side rail 18 with cleat 62, grip 78 and guide 92 positioned in the slot of side rail 18, arm 54 may be pulled toward the operator so that it is generally perpendicular to side rail 18. This action forces ramps 56 of arm 54 to travel down ramps 45 of cavity 44, thereby effectively lowering arm 54 and cleat 62 so that the cleat no longer compresses side rail 18 against the exterior of floor 46. Main body member 24 is thus free to be positioned within and along side rail 18. In this particular embodiment, ramps 45 and 56 are configured to allow a maximum lift of 3 mm. Ramps 45 and 56 may be configured so that their maximum lift is higher or lower depending on the thickness of the material used in manufacturing side rail 18. Stanchion 20 may now be moved anywhere along side rail 18 and positioned to accommodate the size of the article or load being carried on article carrier system 12. Stanchion 20 should be positioned so that grip 78 is located in a detent of side rail 18 to fully lock stanchion 20 to side rail 18.

Grip 78, post 60, and cleat 62 are not only configured to secure stanchion 20 to side rail 18 when the stanchion is locked to the side rail, they are also configured, along with guide 92, to aid the operator in positioning the stanchion and cross rail assembly on the article carrier system. With both stanchions in the unlocked position, a single operator may slide the stanchion and cross rail assembly along side rail 18 into the desired position from one side of the vehicle. Grip 78, post 60, and guide 92 are aligned to prevent the stanchion from being skewed in side rail 18 and limiting its movement. The operator does not have to continually go from side-to-side of the vehicle to position the stanchion and cross rail assembly in the side rail.

Once the operator has positioned stanchion 20 in the desired location, arm 54 may be pushed back toward vehicle 10 so that arm 54 is once again generally parallel to side rail 18. This action forces ramps 56 of arm 54 up ramps 45 of cavity 44, thereby lifting arm 54 and cleat 62 to compress side rail 18 against the exterior of floor 46. The compression of the side rail 18 between cleat 62 and floor 46 of cavity 44 along with the positioning of grip 78 in the detent of side rail 18 securely anchors stanchion 20 to side rail 18. With arm 54 in the locked position, cover 30 may be added to main body member 24 and locked in place with locking mechanism 32. Cross rails 22 are now securely positioned on side rails 18 and may now be used for securing articles to article carrier system 12 for transit.

The locking of cover 30 to main body member 24 not only acts to deter would-be thieves from stealing cross rails 22 and ultimately the load secured to them, the locking of cover 30 to main body member 24 also acts as a visual indication to let the operator know that the stanchion is safely secured to side rail 18. If arm 54 were in an unlocked position (i.e., arm 54 being generally perpendicular to side rail 18), cover 30 could not be locked to main body member 24. Arm 54, in the unlocked position, would interfere with the placement of cover 30 on main body member 24. If cover 30 were not used for some reason, the positioning of arm 54 in the unlocked position, generally perpendicular to side rail 18, also serves to indicate to the operator that stanchion 20 has not been properly locked to side rail 18.

Along with being able to safely secure and lock stanchion to side rail 18, side rails 18 of article carrier system 12 do not require that supports 16 be positioned in article carrier system 12 in a manner such that supports 16 cover the ends of side rails 18, as may be required by other article carrier systems to capture the stanchions on the side rails to prevent theft. In this particular embodiment, side rails 18 may have end caps that are easily removable allowing for the removal of stanchions 20 and cross rails 22 when not in use. As discussed, the described embodiment effectively secures stanchions to side rails in an article carrier system without the fear of having the components of, as well as the articles attached to, the article carrier system stolen and with the confidence of knowing that the articles are completely secured to the vehicle.

The present invention has been particularly shown and described with reference to the foregoing embodiment, which is merely illustrative of the best modes presently known for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiment is illustrative, and no single feature or element is essential to all possible combinations that may be claimed in this or a later application.

What is claimed is:

1. A stanchion for an article carrier system comprising:
    a main body member including a cavity extending inwardly of said main body member from a plate, said cavity including a floor, a first plurality of circumferentially spaced ramps adjacent to said floor;
    an arm including an end sized to rotate within said cavity, said end having a bottom edge, a second plurality of circumferentially spaced ramps positioned adjacent to said bottom edge to selectively engage said first plurality of ramps; and
    a post having a first end positioned within said cavity and secured to said arm, said post having a second end, a cleat positioned adjacent to said second end;
    wherein said first plurality of ramps and said second plurality of ramps are configured to cooperate to raise and lower said cleat in relation to said main body member when said arm is rotated about said main body member.

2. The stanchion as recited in claim 1, further including a cover having a locking mechanism, said locking mechanism being configured to lock said cover to said main body member.

3. The stanchion as recited in claim 2, wherein said main body member includes a depression having a slot for accepting said locking mechanism of said cover.

4. The stanchion as recited in claim 2, wherein said plate includes tabs and a lip and said cover includes protrusions, said tabs, lip and protrusions being configured to position said cover on said main body member.

5. The stanchion as recited in claim 1, wherein said plate includes walls that are positioned to define a cradle for positioning cross rails on said main body member.

6. The stanchion as recited in claim 5, wherein said main body member includes a grip configured to position said stanchion in a side rail.

7. The stanchion as recited in claim 6, wherein said grip is configured to secure a cross rail to said main body member, said grip including a threaded aperture to accept a threaded fastener passing through an aperture in the cross rail to secure the cross rail to said grip and said main body member.

8. The stanchion as recited in claim 1, wherein said plate further includes a guide wall that extends generally vertically downwardly to position said stanchion in a side rail.

9. The stanchion as recited in claim 1, wherein said plate further includes a tab for seating said arm as said arm is in a locked position.

10. A stanchion for an article carrier system comprising:
    a main body member including a cavity extending inwardly of said main body member from a plate, said cavity including a floor having a first plurality of circumferentially spaced ramps, said main body member further including a grip configured to position said stanchion in a side rail;
    an arm having an end sized to rotate within said cavity, and a bottom edge of said end including a second plurality of circumferentially spaced ramps adapted to engage said first plurality of ramps;
    a cover having a locking mechanism, said locking mechanism being configured to lock said cover to said main body member; and
    a post having a first end positioned within said cavity and secured to said arm, said post having a second end including a cleat;
    wherein said first plurality of ramps and said second plurality of ramps are configured to cooperate to raise and lower said cleat in relation to said main body member when said arm is rotated about said main body member.

11. The stanchion as recited in claim 10, wherein said main body member includes a depression having a slot for accepting said locking mechanism of said cover.

12. The stanchion as recited in claim 10, wherein said plate includes tabs and a lip and said cover includes protrusions, said tabs, lip and protrusions being configured to position said cover on said main body member.

13. The stanchion as recited in claim 10, wherein said plate includes walls that are positioned to define a cradle for positioning cross rails on said main body member.

14. The stanchion as recited in claim 10, wherein said grip is configured to secure a cross rail to said main body member, said grip including a threaded aperture to accept a threaded fastener passing through an aperture in the cross rail to secure the cross rail to said grip and said main body member.

15. The stanchion as recited in claim 10, wherein said plate further includes a guide wall that extends generally vertically downwardly to position said stanchion in the side rail.

16. The stanchion as recited in claim 10, wherein said plate further includes a tab for seating said arm as said arm is in a locked position.

17. A stanchion and cross rail assembly for an article carrier system comprising:
    a pair of stanchions, each stanchion having:
        a main body member including a cylindrically shaped cavity extending inwardly of said main body member from a plate, said cavity including a floor having a first plurality of circumferentially spaced ramps, said main body member further including a grip configured to position said stanchion in a side rail;
        an arm, one end of said arm including a hollow cylinder, said cylinder being sized to rotate within said cavity, and a bottom edge of said cylinder including a second plurality of circumferentially spaced ramps adapted to engage said first plurality of ramps;

a post having a first end positioned within said cylinder and secured to said arm, said post having a second end including a cleat; and a cover having a locking mechanism, said locking mechanism being configured to lock said cover to said main body member;

wherein said first plurality of ramps and said second plurality of ramps are configured to cooperate to raise and lower said cleat in relation to said main body member when said arm is rotated about said main body member; and a cross rail disposed between said pair of stanchions.

18. The stanchion as recited in claim 17, wherein said main body member includes a depression having a slot for accepting said locking mechanism of said cover.

19. The stanchion as recited in claim 17, wherein said plate includes tabs and a lip and said cover includes protrusions, said tabs, lip and protrusions being configured to position said cover on said main body member.

20. The stanchion as recited in claim 17, wherein said plate includes walls that are positioned to define a cradle for positioning the cross rail on said main body member.

\* \* \* \* \*